Jan. 13, 1931.  E. V. ANDERSON  1,788,789

VALVE

Filed Dec. 8, 1928  2 Sheets-Sheet 1

INVENTOR
Edward V. Anderson
by Brown & Critchlow
his attorneys

WITNESSES

Jan. 13, 1931.  E. V. ANDERSON  1,788,789
VALVE
Filed Dec. 8, 1928  2 Sheets-Sheet 2

Patented Jan. 13, 1931

1,788,789

UNITED STATES PATENT OFFICE

EDWARD V. ANDERSON, OF BELLE VERNON, PENNSYLVANIA, ASSIGNOR OF ONE-HALF TO CHARLES E. GOLDEN, OF CRAFTON, PENNSYLVANIA

VALVE

Application filed December 8, 1928. Serial No. 324,614.

This invention relates to valves. More particularly it relates to valve mechanisms of the non-return class adapted for heavy pressure steam duty.

In automatically operable non-return valves used for high pressure steam lines the closure members are ordinarily made very heavy because of the severe pressures and shocks to which they are subjected. A sudden decrease of pressure at the inlet side causes the heavy closure members to slam onto their seats with such force as sometimes to wreck the valve, and frequently to injure the seat. Sometimes where a boiler is supplying a number of engines from a common main these will get in step, the resulting pulsating effect may cause the valve disks to pound their seats to the point of destruction.

These difficulties are in large measure avoided in the present case by a construction comprising a comparatively light closure member, mounted to be easily responsive to pressure reversal, but mechanically retarded enough to prevent immediate closure.

Among the objects of the invention are to provide a valve mechanism of a construction permitting easy access to all of the working parts; to provide a valve giving comparatively small obstruction to the passage of fluid therethrough when in open position; to provide a normally automatically operative valve mechanism that may be readily and positively closed by hand so that it can not then be opened automatically by fluid pressure; to provide a valve mechanism which will normally automatically open to permit flow of fluid therethrough, but which will quickly, accurately, and safely shut off reverse flow of such fluid upon a failure of pressure on the supply side of the valve, said shutting off being accomplished by a relatively light, floatingly-mounted, mechanically-retarded closure member, whereby to prevent destructive hammer effects in closing. Other advantages will be apparent to those familiar with the art from a study of the drawings and the following specification.

For convenience the whole valve mechanism will be referred to as the valve, and the valves proper as the closure disk or member and the locking disk or member, respectively.

Figures 1, 2:
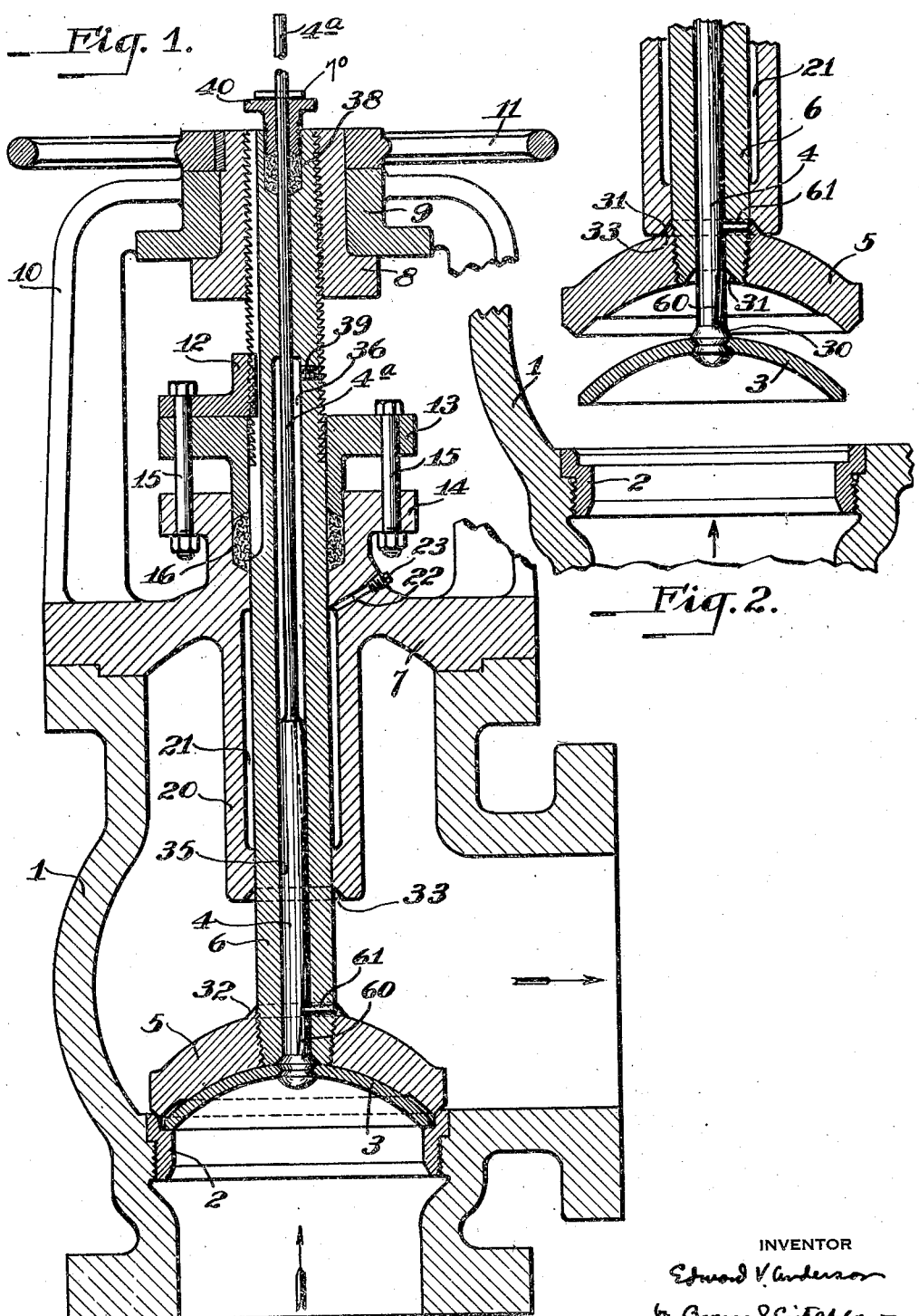
Figure 3:
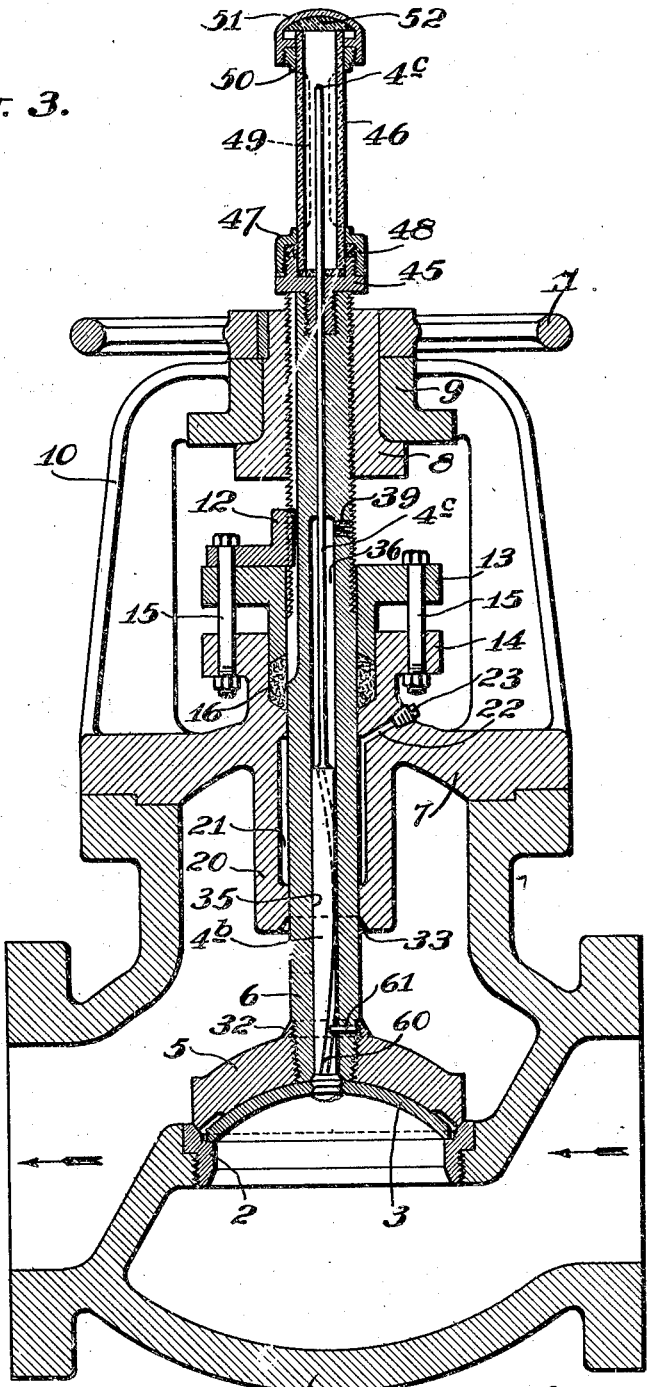

Fig. 1 is a central vertical section through a valve with angularly-positioned inlet and outlet embodying this invention, showing the parts in position as when manually closed and locked in that position; Fig. 2 is a partial vertical section similar to that of Fig. 1, but showing the valve in normal open automatically operative position; and Fig. 3 is a central vertical section through a modification comprising a valve mechanism in a horizontal casing with a modified indicating device, the closure members being locked on their seats.

Referring to Fig. 1, the valve comprises a main casing member 1, having a double-faced valve seat 2 removably mounted therein and adapted to receive on an inner face an arched closure disk 3, rigidly carried on a vertically reciprocable valve stem 4. A manually-controlled locking disk 5 is adapted to seat on the upper face of the closure disk 3, and the outer edges of the disk 5 are adapted to seat upon an inclined upper annular face of the seat member 2 and to make a fluid-tight joint therewith. See Fig. 3. The lower outer face of disk 5 is cut away to provide a space between the disks so that fluid pressure may always be effective behind disk 3. Disk 3 is very light compared to disk 5 and to the closure members usually used in valves in the same capacity. Disk 5 is heavy compared to disk 3, and is adapted to lock the passage permanently when that is desired.

Locking disk 5 is removably carried by hollow stem 6, slidably mounted in a central bore of the bonnet 7, which seats upon and completes the casing 1 and is removably attached thereto. The upper portion of valve stem 6 is externally threaded, and is engaged by a nut 8, rotatably mounted in a collar member 9, formed by frame members 10 extending upward from the bonnet 7. A hand wheel 11 is keyed to the nut 8, and seats on the collar 9. A key member 12 engages a longitudinal keyway in the valve stem 6 to prevent rotation thereof. The key is attached to a packing gland 13 which surrounds the stem 6, and extends into an enlarged bore at the top of a flanged upward central extension 14 of the bonnet 7. Bolts 15 extend through flanges of the members 13 and 14 and are adapted to compress the gland. An enlarged bore in the extension 14 is adapted to retain a packing 16 surrounding the stem.

The bonnet 7 carries a downward central extension 20, centrally bored to receive the stem 6, the bore being enlarged intermediately to form a space 21 around the stem. This space is connected by means of a hole 22 to the atmosphere, the hole being controlled by means of a threaded plug 23. By removing this plug pressure is relieved around the stem 6, and the packing 16 may be tightened without fluid pressure resistance.

Valve stem 4 is rigidly attached to disk 3, preferably by riveting and welding. Just above the disk the stem forms a tapered seat portion 30 adapted to engage a complementary seat portion 31 in the lower face of the locking disk 5, so that when the disks are in contacting position fluid pressure will not escape around the stem 4 and inside the stem 6.

The disk 5 has a seat portion 32 adapted to cooperate with a seat portion 33 in the lower end of extension 20. This arrangement is adapted to prevent leakage of fluid from the main valve chamber around the valve stem 6 when the locking disk is in raised position. The under side of disk 5 is cut away toward the outer edge to form an outer annular clearance between disks 3 and 5 when they are in contacting position. This permits fluid pressure behind disk 3 to start its closing movement on reversal of pressure, as below described.

The stem 4 is adapted to slide easily in the stem 6. The lower portion of the stem 4 fits neatly the bore 35 of valve stem 6, but the upper portion of the stem 4 is reduced in size to form a smaller portion 4a, which is adapted to fit neatly a reduced upper bore 36 of the valve stem 6. A packing 38 surrounds the stem 4a near the upper end of the stem 6, and is adapted to be compressed by a threaded gland 40 to prevent the escape of any fluid around the stem 4. A threaded plug 39 extends through the side wall of the stem 6 into the bore 35. By removing this the packing 38 may be readily compressed without resistance of fluid pressure.

In Fig. 3 a modification is shown. The horizontal casing is arranged for flow from side to side of the valve, but the casing takes the same bonnet as that of Fig. 1, and there is no functional difference in the operating parts above described. Therefore the same numerals are used in the two figures on corresponding parts followed by a letter where there is any modification. In the modified valve, instead of the packing 38 at the upper end of the valve stem 6, that member has threaded into it a bored terminal piece 45, which carries a cylindrical gage glass 46. This glass is held in position by means of a cage member 47, the lower end of which has threaded engagement with the member 45, with a packing ring 48 therebetween. Straps 49 extend upward on each side of the gage glass to a collar member 50, to which is threaded a cap member 51. A packing 52 between the cap 51 and the top of the glass makes a fluid-tight joint therewith. The upper end 4c of the valve stem 4b extends into this glass and may be observed therethrough. The level of the end of stem 4b indicates the open or closed position of disk 3, as will be apparent.

The lower portion of valve stem 4 has a spiral groove 60, commencing just above the connection of the stem to the disk 3, and extending upward to the beginning of the reduced portions 4a and 4b, respectively, in the two forms shown. A pin 61 extends through the side wall of the stem 6 and into the groove 60.

Disks 3 and 5 and stems 4 and 6 are preferably made of high quality stainless steel, so that corrosion may not cause sticking of the stems in their bores. The disk 3 is of arch shape so that it gives maximum strength as against reverse steam pressure. The edges of disks 5 are cut away underneath to provide a clearance at the periphery of disk 3 so that steam can get between the disks to close the valve.

The operation of the valve is as follows:

The flow of steam is as indicated by the arrows. When the valve is in service the locking disk 5 is raised to the position shown in Fig. 1 by turning the hand wheel 11 to raise the valve stem 6 to uppermost position. This would leave the valve disk 3 in seated position, but as the weight of this disk and its stem are comparatively small, and as the frictional contact of the valve stems 4 and 4a (4b and 4c in the modification) in the bore and packing enclosing them, is slight, a very small pressure of steam under the disk 3 serves to raise it to open position as shown in Fig. 2. Steam then flows through the valve, holding the disk 3 up. Due to the lightness of the disk 3 compared to the heavy closure valves ordinarily used, and to the fact that the frictional engagement of its stem with the bore and packing is almost sufficient to counterbalance the weight, the disk 3 in effect floats in the steam stream. Consequently a very small difference of fluid pressure exists on the two sides of this valve. It is therefore readily responsive to fluid flow and will automatically open and close with direction of flow when in normal condition, i. e., when not locked down by the heavy normally controlled closure member.

If at any time it is desired to positively shut off the steam, as for the purpose of making a hydrostatic test of a boiler, to cut out a boiler from the engine, etc., the hand wheel 11 is operated to bring the disk 5 down against disk 3, and to force the two into seated position as shown in Fig. 3. This positively locks the whole valve mechanism and there can be no flow of steam therethrough by automatic opening.

When it is desired to put the valve into automatically-operative position again, the hand wheel is used to raise the stem 6 and disk 5. Steam will then flow from the boilers to the engine.

If for any reason steam pressure at the boiler or supply side of the valve falls below that on the other side, return flow of steam will catch the disk 3 and move it to its seat thus closing the valve. The pin 61 in the spiral slot 60 retards the seating of the disk 3 by causing a turning of the disk 3 and its stem as it moves downward, thus acting in effect as a mechanical brake to prevent a too rapid seating of the disk. However, the disk 3 and its stem are so comparatively light, and their weight is so balanced against their frictional mounting that the disk 3 is very sensitive to flow change, and on account of its immediate responsiveness to change of pressure, and its comparatively small inertia, it will not produce the dangerous impact effects which occur with some of the heavy closure disks heretofore used.

If it is desirable at any time to render the automatic features of the valve as shown in Fig. 1 inoperative, the disk 3 may be locked to disk 5 by inserting a pin 70 through a suitably positioned hole in stem 4a. This makes the valve operation manual only.

I claim:

1. A non-return valve for heavy fluid-pressure duty, comprising a casing having a passage therethrough, a valve seat surrounding the passage, a floatingly-mounted closure disk adapted to cooperate with the seat to automatically control the passage, and a manually-operable locking disk adapted to seat on the back of the closure disk and also on the said valve seat, the closure disk being mounted to be responsive to flow of fluid through the passage.

2. A non-return valve for heavy fluid pressure duty comprising a casing having a fluid passage therethrough, a valve seat surrounding the passage, a light floatingly-mounted closure member adapted to be responsive in movement to flow of fluid through the passage and adapted to cooperate with the said seat to close the passage upon reversal of flow therein, a heavy locking member adapted to seat on the closure member and on the valve seat, and manually operable means for raising and lowering the locking member.

3. A non-return valve for heavy fluid-pressure duty, comprising a casing having a passage therethrough, a valve seat surrounding said passage, a closure disk adapted to automatically control said passage in cooperation with said seat, a locking disk adapted to seat on the back of the closure disk and on the valve seat whereby to positively close the passage, manually operable means for moving the locking disk to and from the valve seat, the closure disk being mounted to respond automatically to direction of movement of fluid through the valve seat when not prevented by the locking disk.

4. A non-return valve for heavy fluid-pressure duty, comprising a casing having a passage therethrough, a valve seat surrounding said passage, a closure disk adapted normally to control said passage in cooperation with said seat, a locking disk adapted to seat on the back of the closure disk and on the valve seat whereby to positively close the passage, and prevent normal operation of the closure disk, manually operable means for moving the locking disk to and from the valve seat, the closure disk being floatingly-mounted so as to be able normally to move with flow of fluid through the passage, and external visible means to indicate the relative positions of the closure disk and locking disk with respect to the valve seat.

5. A non-return valve for heavy fluid-pressure duty comprising a casing having a passage therethrough, a valve seat surrounding said passage, a floatingly-mounted closure disk adapted to control said passage and to seat on said valve seat, and a manually-controlled locking disk adapted to seat on the closure disk and on the valve seat whereby to positively close the passage, and means to retard closing movement of the closure disk.

6. A non-return valve for heavy fluid pressure duty comprising a casing having a passage therethrough, a two-faced valve seat surrounding said passage, a floatingly-mounted closure disk adapted to automatically control said passage and to seat on said valve seat, a locking disk adapted to seat on the closure disk and on the valve seat whereby to positively close the passage, manually operable means for moving the locking disk to and from the valve seat, and externally-visible means to indicate the positions of the closure disk with respect to the seat.

7. A non-return valve for heavy fluid-pressure duty comprising a casing having a passage therethrough, a valve seat surrounding said passage, a floatingly-mounted closure disk adapted to control said passage and to seat on said valve seat, and a manually-controlled locking disk adapted to seat on the closure disk and on the valve seat whereby to positively close the passage, means to retard closing movement of the closure disk, and external visible means to indicate the positions of the two disks relative to the seat.

8. A non-return valve for heavy fluid pressure duty, comprising a casing having a passage therethrough, a valve seat surrounding said passage, a closure disk adapted to control said passage and to seat on said valve seat, a locking disk adapted to seat on the closure disk and on the valve seat whereby to positively close the passage, manually operable means for moving the locking disk to and from the valve seat, a hollow stem reciprocably mounted in the valve casing and carrying the locking disk, a second stem reciprocably mounted in an axial bore of the first mentioned stem and carrying the closure disk, said second stem extending beyond the end of the first stem and being visible from outside the valve casing.

9. A non-return valve for heavy fluid pressure duty comprising a casing having a passage therethrough, a valve seat surrounding the said passage and mounted in the said casing, a main valve stem mounted in the casing and adapted to be reciprocated on its longitudinal axis to and from the said valve seat, a locking disk carried on the inner end of the said main valve stem and adapted to cooperate with the said valve seat to close said passage, the upper end of said main valve stem being threaded, means to prevent rotation of the main valve stem, a rotatable threaded member engaging the threaded portion of the valve stem, manually controlled means to rotate said threaded member to raise and lower the valve stem, an inner valve stem fitted into an axial bore in the main valve stem and reciprocable therein, a light closure disk on the end of said inner valve stem adapted to seat on the said valve seat and thereby to close the passage therethrough, the inner valve stem having a spiral groove therein, a fixed pin extending through the first valve stem and into the said groove, whereby to retard the inner stem upon movement thereof relative to the first stem, the outer end of the inner valve stem extending beyond the outer end of the first valve stem to a point where it is visible from outside the valve casing, whereby to indicate the relative positions of the closure disk and locking disk with respect to the valve seat.

10. A non-return valve for heavy fluid pressure duty comprising a casing having a fluid passage therethrough, a two-faced valve seat fixed in the casing and surrounding the said passage, a heavy closure member adapted to cooperate with the valve seat to close the said passage, manually operable means for raising and lowering the closure member to and from said seat, a light closure member positioned beneath the heavy closure member, and having a stem reciprocably mounted in an axial bore of the stem of the heavy closure member, and means to retard the movement of the light closure member with respect to the heavy closure member, the light closure member being normally adapted to be opened by normal flow of fluid through the valve and to be automatically closed by reversal of flow therethrough.

11. A non-return valve for heavy fluid pressure duty comprising a casing having a passage therethrough, a valve seat surrounding the said passage and mounted in the said casing, a valve stem mounted in the casing and adapted to be reciprocated on its longitudinal axis to and from the said valve seat, a locking disk carried on the inner end of the said valve stem and adapted to cooperate with the said valve seat to close said passage, the upper end of said valve stem being threaded, means to prevent rotation of the valve stem, a threaded member cooperating with the threaded portion of the valve stem, manual means to rotate said threaded member to raise and lower the valve stem, an inner valve stem slidably fitted into an axial bore of the first mentioned valve stem and reciprocable therein, a closure disk on the inner end of said inner valve stem adapted to seat on the said valve seat and thereby to close the passage therethrough, the outer end of the inner valve stem extending beyond the outer end of the first valve stem to a point where it is visible from outside the valve casing whereby to indicate the relative position of a closure disk with respect to the locking disk and with respect to the valve seat.

12. A non-return valve for heavy fluid pressure duty, comprising a casing having a fluid passage therethrough, a double-faced valve seat fixed in the casing and surrounding the said passage, a heavy closure member adapted to cooperate with the valve seat to close the said passage, manually operable means for raising and lowering the heavy closure member to and from said seat, a light floatingly-mounted closure member positioned beneath the heavy closure member and having a stem reciprocably mounted in an axial bore of the stem of the heavy closure member, means to retard the movement of the light closure member with respect to the heavy closure member, and externally visible means to indicate the positions of the two closure members relative to the valve seat.

13. A non-return valve for heavy fluid pressure duty, comprising a casing having a fluid passage therethrough, a double-faced valve seat fixed in the casing and surrounding the said passage, a heavy closure member adapted to cooperate with the valve seat to close the said passage, manually operable means for raising and lowering the heavy closure member to and from said seat, a light floatingly-mounted closure member positioned beneath the heavy closure member and on the same side of the valve seat, means to retard the movement of the light closure member with respect to the heavy closure member, the light closure member being adapted to be opened by normal flow of fluid through the valve and to be automatically closed by reversal of flow therethrough, and externally visible means comprising an extension of a stem of the light closure member to indicate the positions of the two closure members relative to the valve seat.

14. A valve mechanism comprising a casing having a fluid passage therethrough, a valve seat, a light floatingly-mounted closure member normally movable to and from said seat with flow of fluid through the passage, a heavy locking manually-operable closure member mounted behind the light closure member and adapted to force and hold the latter against the seat, the underside of the locking member being cut away about the outer portion to provide a peripheral clearance between the two closure members when they are in contact.

In testimony whereof, I sign my name.

EDWARD V. ANDERSON.